(12) United States Patent
Loh et al.

(10) Patent No.: US 6,295,198 B1
(45) Date of Patent: Sep. 25, 2001

(54) COMPUTER DEVICE

(75) Inventors: Philip Kwok Nan Loh; Tai Woon Woon; Yeow Paul Tan, all of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/520,072

(22) Filed: Mar. 7, 2000

(51) Int. Cl.[7] .................................................. G06F 1/16
(52) U.S. Cl. ...................... 361/683; 361/724; 312/223.2; 292/148
(58) Field of Search ................................. 361/683–686, 361/724–727, 680, 681, 740, 759; 312/223.2, 223.3, 216, 218; 400/713, 714; 206/320, 576; 248/551–553; 70/57–58, 85; 292/42, 148, 151, 307 R

(56) References Cited

U.S. PATENT DOCUMENTS

| | | | | |
|---|---|---|---|---|
| 5,105,338 | * | 4/1992 | Held | 361/683 |
| 5,506,749 | * | 4/1996 | Matsuda | 361/683 |
| 5,555,157 | * | 9/1996 | Moller et al. | 361/683 |
| 5,682,993 | * | 11/1997 | Song | 361/683 |

* cited by examiner

*Primary Examiner*—Leo P. Picard
*Assistant Examiner*—Hung Van Duong

(57) ABSTRACT

A computer device comprises a casing in which are accommodated an electronic circuit and a touch screen, a protective cover movably arranged on the casing for selectively covering and uncovering at least the touch screen, and a stylus for operating said touch screen. The protective cover includes a compartment which substantially corresponds to the shape of at least part of the stylus and in which the stylus is removably stored, thereby reducing the size of the computer device for more convenient handling of the same by a user.

17 Claims, 6 Drawing Sheets

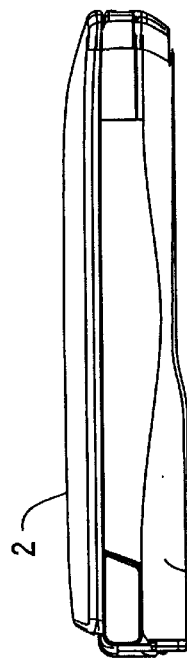
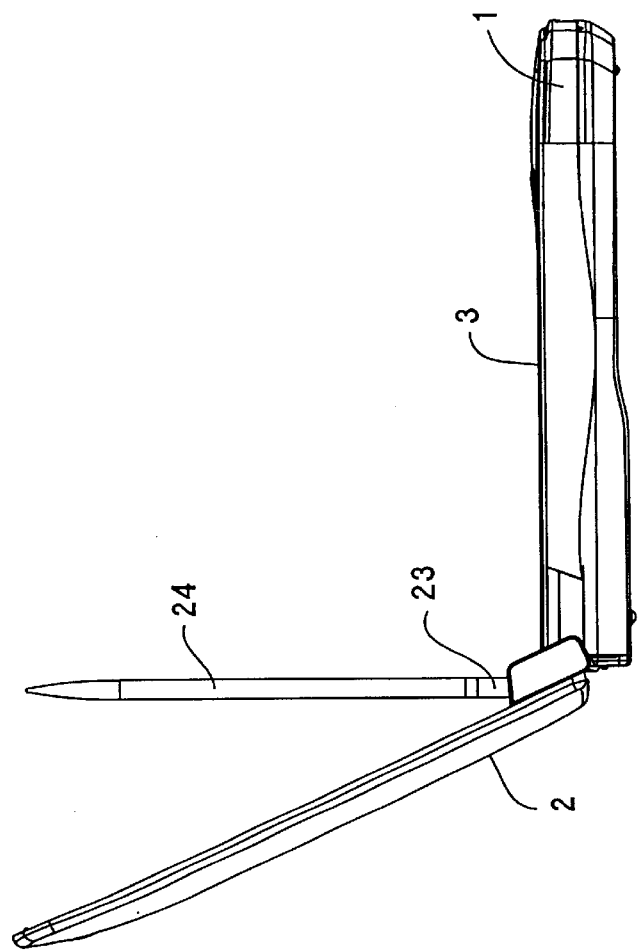
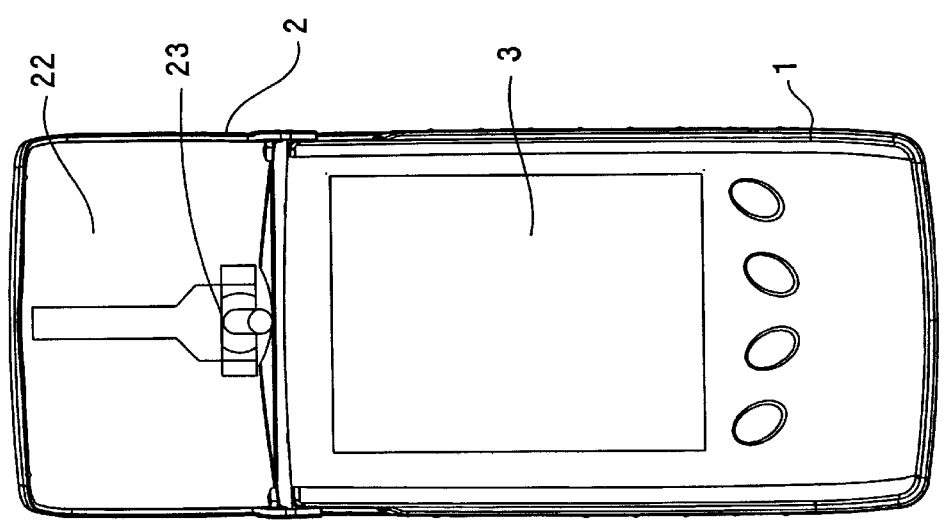

COMPUTER DEVICE

BACKGROUND OF THE INVENTION

The present invention relates to a computer device, especially a Personal Digital Assistant (PDA), comprising a casing in which are accommodated an electronic circuit and a touch screen, a protective cover movably arranged on the casing for selectively covering and uncovering at least the touch screen, and a stylus for operating said touch screen.

The stylus is the primary tool used to perform data input tasks on most PDA devices. Therefore, it is very important to provide users with convenient access to the stylus when they need to use it in conjunction with operation of the PDA device. Of equal importance is that returning the stylus to its designated storage location after use should also be hassle-free. The actions of retrieving and replacing the stylus from/to the designated storage are generally repeated many times during any period of using the PDA device.

In all typical PDA devices, the space allocated for storing the stylus is often found within the case enclosure of the device. In such designs, scarce volumetric space is taken up to fit in the stylus which otherwise could be put to better use—such as fitting in electronic circuits that must reside within the enclosure of the PDA device. There are, however, abundant volumetric spaces immediately exterior of the device that are seldom put to good use. An example of such abundant spaces can be easily found in PDA devices that have a protective cover. Typically the protective covers are designed to be set back a substantial distance from the display screen which is delicate because it is made of glass material. In such a situation, there is a generous amount of empty volumetric space in between the surface of the display screen and the inner surface of the bulging protective cover.

SUMMARY OF THE INVENTION

An object of the present invention is to provide a computer device in which the available volumetric space in between the surface of the display screen and the inner surface of the protective cover is better used in an appropriate way.

According to the present invention, this is achieved by including, in the protective cover, a compartment which substantially corresponds to the shape of at least part of the stylus and in which the stylus is removably stored.

By arranging the compartment on the protective cover for storing the stylus it is possible to reduce the width of the computer device including a touch screen and a stylus, resulting in better ergonomics (holding comfort) when the device is being held in the palm of a user. Additionally, it allows users a novel experience in terms of the way that the stylus is retrieved and stored in a computer device, especially in a PDA device. Further, the stylus stored within the compartment on the protective cover is not prone to accidental dislodging. The invention allows a user a convenient way of drawing the stylus out since the action of drawing the stylus out follows naturally from the action of flipping open the protective cover.

The above and other objects, features and advantages of the present invention will become apparent from the following description and the appended claims, taken in conjunction with the accompanying drawings in which like parts or elements are denoted by like reference numbers.

BRIEF DESCRIPTION OF THE DRAWINGS

FIG. 7 is a plan view of a PDA according to yet another embodiment of the present invention, wherein the protective cover is opened;

FIG. 8 is a side view of the PDA of FIG. 7, wherein the stylus is tilted away from the protective cover; and FIG. 9 is a side view of the PDA of FIG. 7, wherein the protective cover is closed.

DETAILED DESCRIPTION OF THE INVENTION

Preferred embodiments of the present invention will now be described with reference to the attached drawings.

Figure 1:
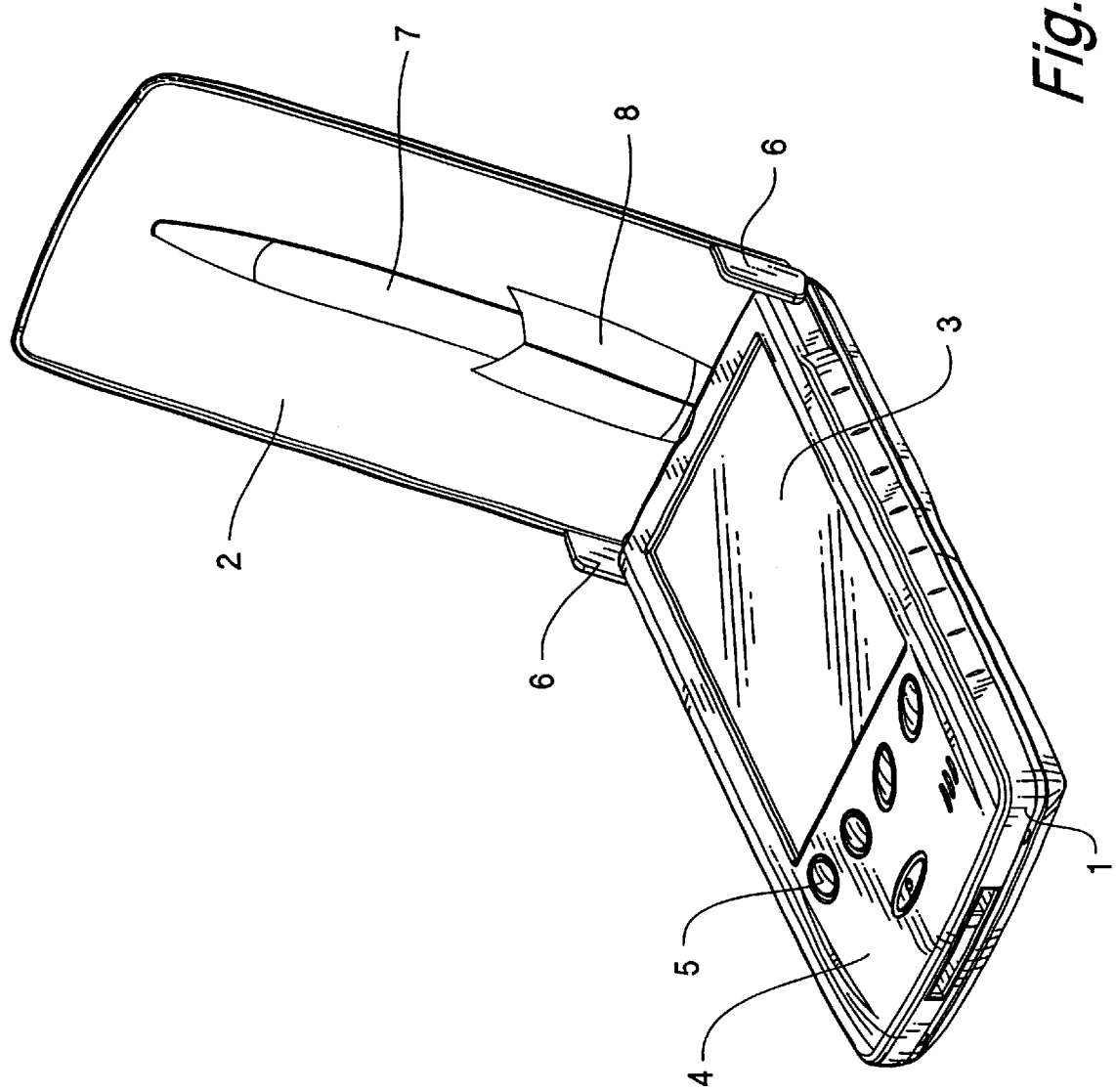
FIG. 1 is a perspective view of a Personal Digital Assistant (PDA) according to an embodiment of the present invention, wherein the protective cover is opened.

FIG. 1 shows a PDA device according to an embodiment of the present invention, comprising a rectangular casing 1 and a protective cover 2 pivotally arranged on a longitudinal end of the casing 1. A touch screen 3 and a switch panel 4 including switch buttons 5 which are connected to an electronic circuit (not shown) are provided on a front side of the casing 1 covered by pivoting the protective cover 2 thereto. All edges of the casing 1 are rounded to have a good design and to provide good handling for using the PDA by an operator.

The protective cover 2 has two opposite projections 6 including pins (not shown) and being formed on a longitudinal end of the protective cover 2 for pivotally engaging with openings (not shown) formed in the one longitudinal end of the casing 1. An inner side of the protective cover 2 is concave so that a central longitudinal portion of the inner side of the protective cover 2 constitutes a concavity in which a compartment for removably storing a stylus 7 is formed. The stylus 7 has a small circular cross section and is used for touching the touch screen 3 to perform data input tasks on the PDA device. The compartment is formed as a retention sheath 8 and arranged on the one longitudinal end of the protective cover 2 which is pivotally connected to the casing 1. The retention sheath 8 substantially corresponds to the shape of part of the stylus 7 and receives part of the stylus 7 therein.

The storing of the stylus 7 in the compartment provided in the inner side of the protective cover 2 has the advantage that the available volumetric space formed in-between the protective cover 2 and the front side of the casing 1 is used in a suitable manner so that the overall size of the casing 1 is reduced since the stylus 7 is not to be stored in the casing 1.

Therefore, it is possible to chamfer the edges on all sides of the casing 1 to allow for comfortable holding when the PDA device is held in the palm of the operator. The arrangement and design of the retention sheath 8 allows a user friendly way of drawing the stylus 7 out since the action of drawing the stylus 7 follows naturally from the action of flipping open the protective cover 2, and the stylus 7 can be easily inserted into the retention sheath 8 by the operator.

The concavity in the inner side of the protective cover 2 allows arrangement of the compartment in such a way that a sufficient distance is provided between the compartment and the touch screen 3 of the casing 1 when the protective cover 2 is closed. Therefore, the touch screen 3 is prevented from being damaged by the compartment.

Further, in this embodiment of the present invention, the retention sheath 8 for receiving part of the stylus 7 is integrally formed with the protective cover 2. Such an integral form requires the stylus 7 to be short so that it can be easily inserted into and removed from the retention sheath 8 of the protective cover 2. Additionally, the integrally formed protective cover 2 can be produced simply at low cost.

Figure 2:
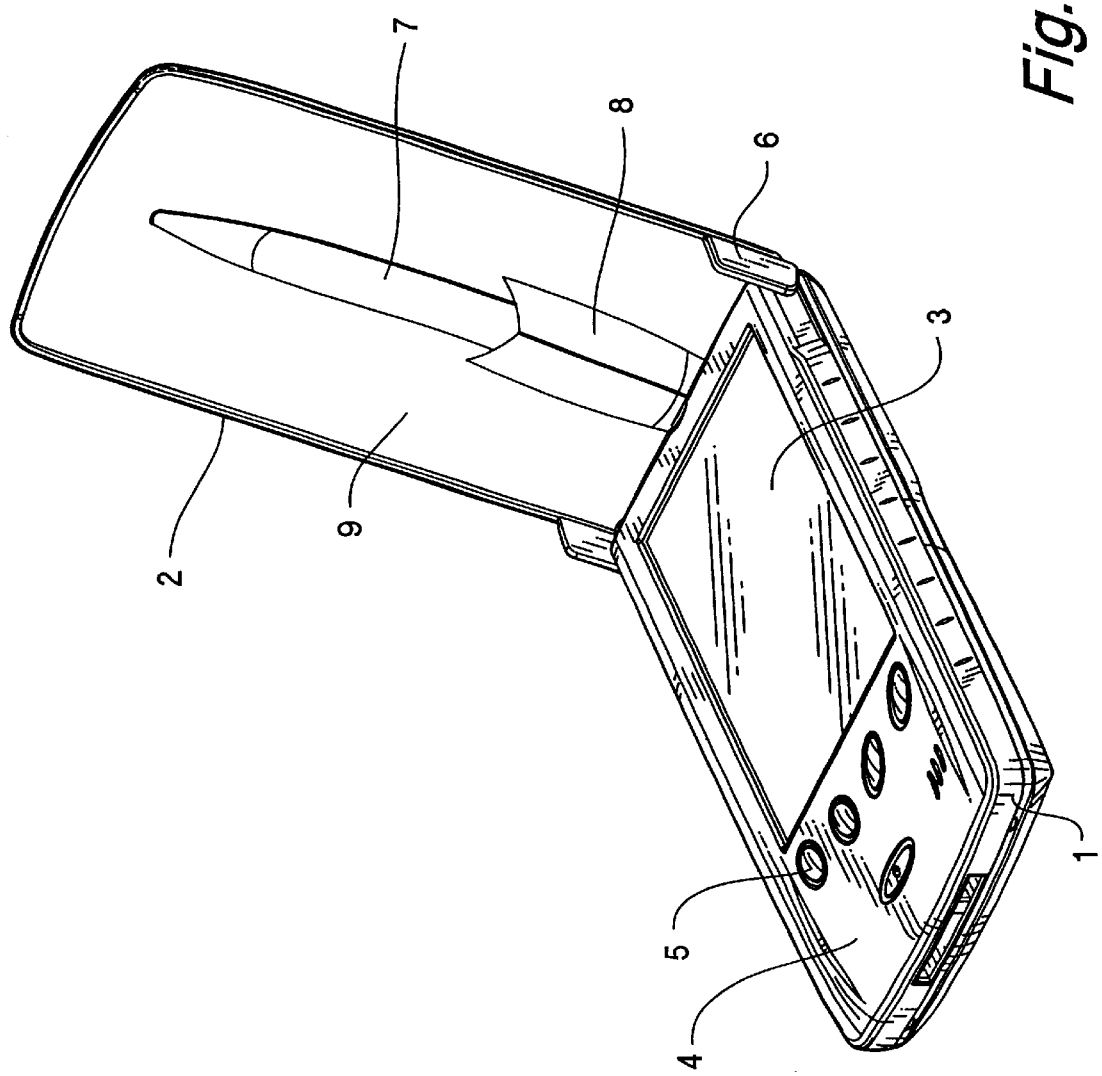
FIG. 2 is a perspective view of a PDA according to another embodiment of the present invention, wherein the protective cover is opened.

As shown in FIG. 2, a PDA device according to another embodiment of the present invention is provided with a protective cover 2 comprising an inlay 9 mounted on the inner side of the protective cover 2 and integrally formed with the retention sheath 8. The inlay 9 can be made of a plastic material which is formed by either injection moulding or press forming from the back side of the inlay 9, and the protective cover 2 can be made of aluminium. The inlay 9 and the protective cover 2 can be attached together by adhesive. This allows the protective cover 2 to have a sufficient strength and rigidity since the protective cover 2 is reinforced by the inlay 9. If the stylus 7 and the boundary wall of the retention sheath 8 are of adequate sizes, they can provide some amount of reinforcement. This is independent of the PDA device whose thickness is governed largely by what is packaged inside its own enclosure.

Figure 3:
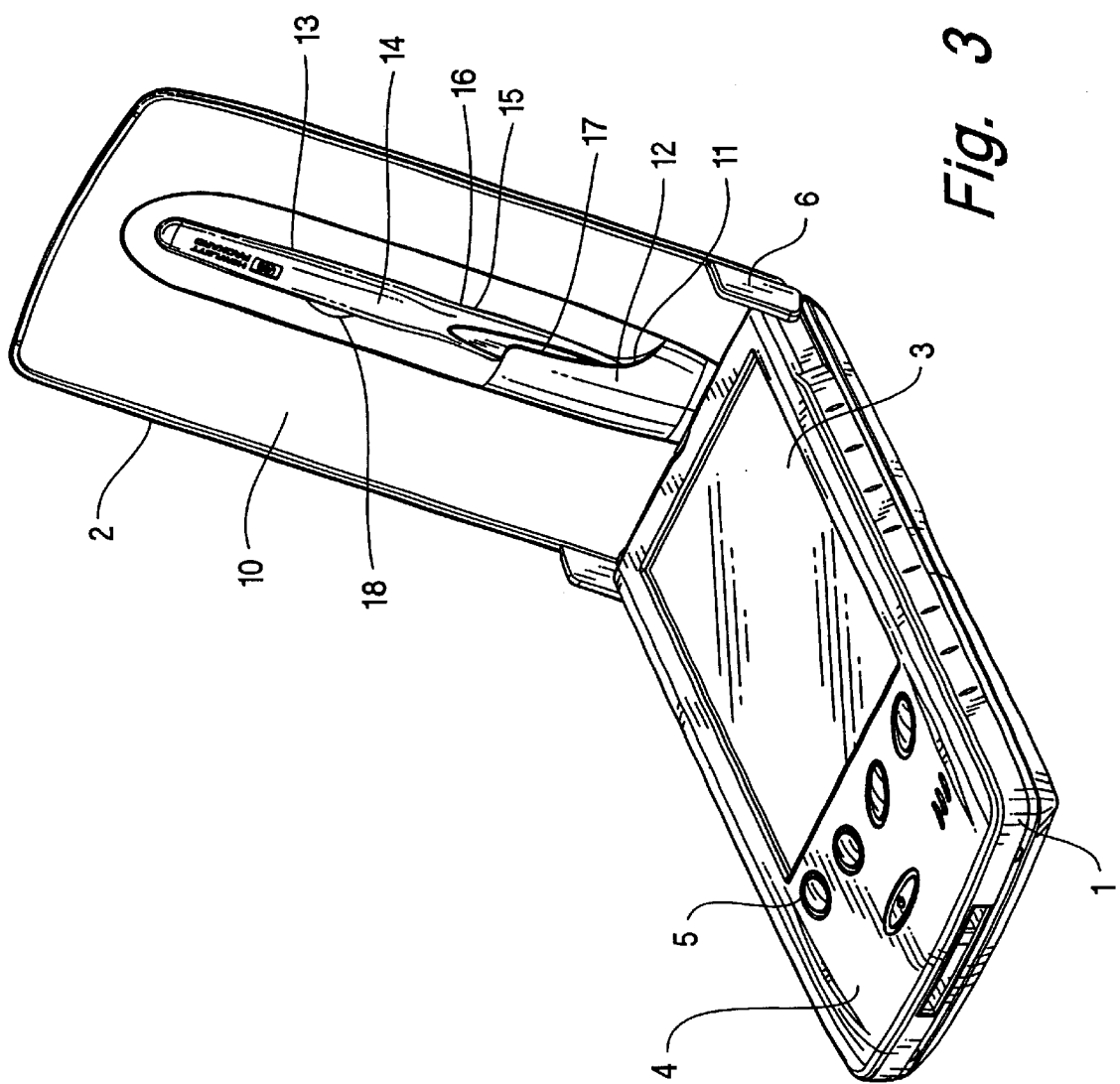
FIG. 3 is a perspective view of a PDA according to yet another embodiment of the present invention, wherein the protective cover is opened.

FIG. 3 shows a PDA device according to yet another embodiment of the present invention. In this embodiment, the protective cover 2 comprises an inlay 10 including a compartment which has a longitudinal slot 11 and a retention sheath 12. The slot 11 has opposite longitudinal sides and opposite longitudinal ends and is surrounded by a boundary wall 13 which has a flat shape. The slot 11 is designed so that a flat stylus 14 can be stored therein. For better locating and fitting the stylus 14 relative to the slot 11, the slot 11 has a central portion 15 including a reduced width, and the stylus 14 has a narrowed portion 16 which corresponds to the width of the central portion 15 of the slot 11.

Further, the retention sheath 12 is formed on the one longitudinal end of the slot 11 directed to the longitudinal end of the protective cover 2 pivotally connected to the casing 1, wherein the retention sheath 12 has an opened portion directed toward the other longitudinal end of the slot 11. Additionally, the retention sheath 12 has a curved cut-out 17 which extends on the one longitudinal side of the slot 11 toward the other longitudinal end of the slot 11. This allows the flat stylus 14 to be easily pivoted around the region of its pointed end within the retention sheath 12, so that the stylus 14 can be better inserted into and removed from the compartment. Also, the curved cut-out 17 of the retention sheath 12 allows a longer stylus 14 as opposed to that of the previously described embodiment, and insertion of the stylus 14 into the compartment does not need point accuracy as is the case in the previously described embodiment.

The boundary wall 13 of the slot 11 at the one longitudinal side of the slot 11 on which extends the curved cut-out 17 of the retention sheath 12 is lower than the boundary wall 13 at the other longitudinal side of the slot 11. Therefore, the longitudinal edges of the flat stylus 14 can better slide along the lower boundary wall 13 at the one longitudinal side of the slot 11 when the stylus 14 is to be removed from the compartment by pivoting and drawing the stylus 14 therefrom. By such differences in the height of the boundary wall, the slot 11 is designed to reliably guide and locate the flat stylus 14.

The other longitudinal side of the slot 11 having the higher boundary wall 13 includes an indentation 18 for facilitating engagement of the stylus 14 to pivotally retrieve the same out of the slot 11. The indentation 18 allows easy engagement by a finger of an operator to draw the stylus 14 out of its stored position.

Figure 4:
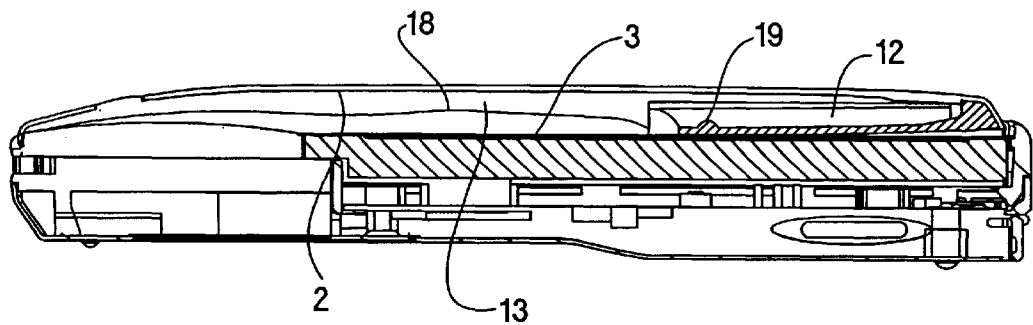
FIG. 4 is a longitudinal section view of the PDA of FIG. 3, wherein the protective cover is closed.

As shown in FIG. 4, a locking projection 19 is formed on the inner side of the retention sheath 12, which locking projection 19 engages a locking recess 20 (shown in FIG. 6) formed in the stylus 14. Therefore, the stylus 14 is reliably secured within the compartment and is not prone to accidental dislodgement from the compartment.

Figure 5:
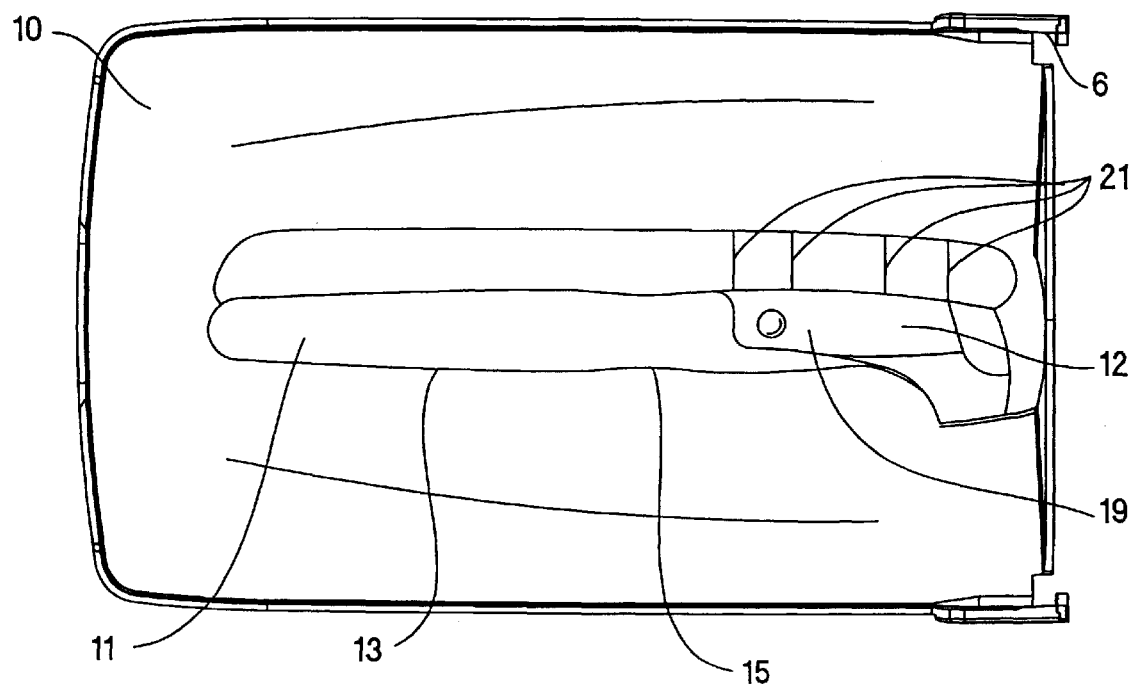
FIG. 5 is a back view of the inlay of the protective cover of FIG. 3.

FIG. 5 shows a back view of the inlay 10 of the protective cover 2. As described above, the inlay 10 is produced by press forming. For this reason, tensions can occur in the plastic material. To avoid this problem, the boundary wall of the compartment has a plurality of supporting ribs 21 on the back side of the inlay 10 to avoid tensions and additionally reinforce the boundary wall of the compartment. The supporting ribs 21 can also be formed in other sections of the inlay 10.

Figure 6C:
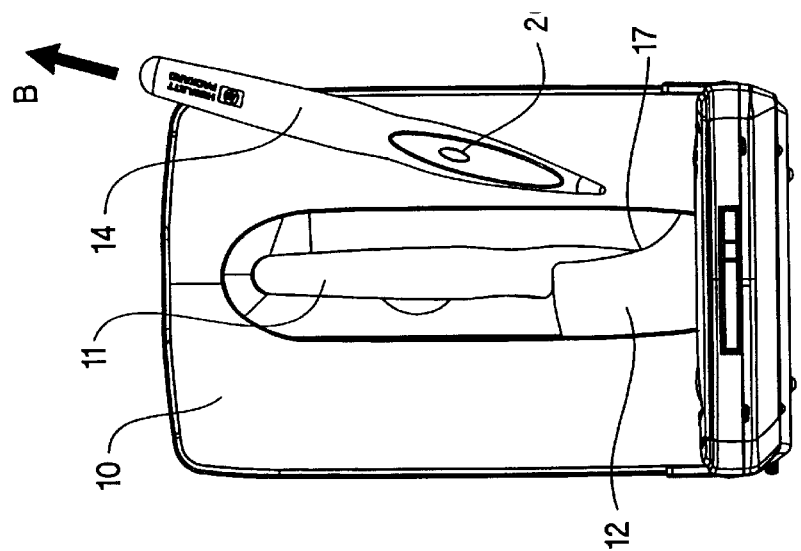
FIG. 6 A–C is a view showing the operation of removing the stylus from the protective cover of the PDA of FIG. 3.
Figure 6B:
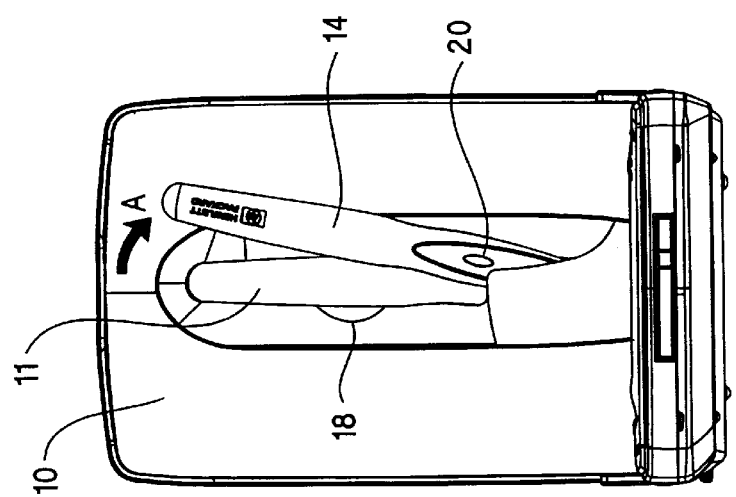
Figure 6A:
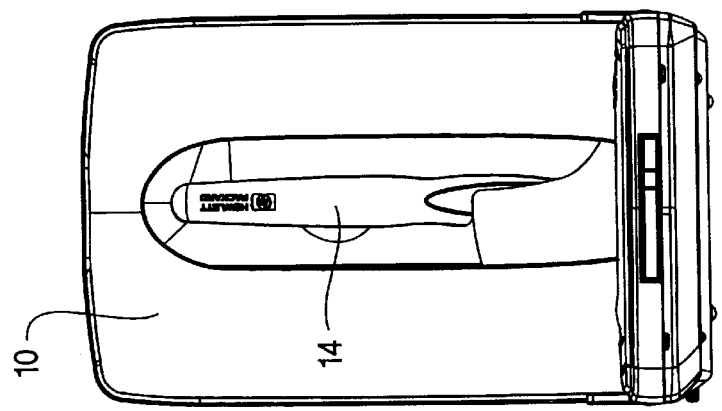

FIG. 6 shows the operation of removing the stylus 14 from the compartment of the protective cover 2 of the PDA according to the embodiment described above with respect to FIGS. 3 to 5. As seen in FIG. 6, the stylus 14 is first pivoted around the region of its pointed end from the compartment in direction of the arrow A by engaging a finger of the operator into the indentation 18 to push the stylus 14 from the slot 11 of the compartment, whereby the locking projection 19 of the retention sheath 12 and the locking recess 20 of the stylus 14 are disengaged. Then, the stylus 14 is drawn from the retention sheath 12 along the curved cut-out 17 and lifted away from the protective cover 2 in the direction of the arrow B. Therefore, the stylus 14 can be easily removed from the compartment of the protective cover 2.

FIGS. 7 to 9 show a PDA device according to yet another embodiment of the present invention. In this embodiment, the protective cover 2 is provided with an inlay 22 including a compartment which comprises a swivel catch 23 for tilting a stylus 24 away from the protective cover 2 to allow the stylus 24 to be removed. The swivel catch 23 is pivotally arranged on the inlay 22, wherein the pivot axis of the swivel catch 23 extends perpendicular to the longitudinal axis of the protective cover 2 in a plane thereof. Therefore, as shown in FIG. 8, the stylus 24 can be tilted away from the protective cover 2 so that the stylus 24 can be easily drawn from and inserted into the compartment.

While the preferred embodiments of the invention has been described, they are merely illustrative of the principles of the invention. Other embodiments and configurations may be devised without departing from the spirit of the invention and the scope of the appended claims.

What is claimed is:

1. A computer device comprising a casing in which are accommodated an electronic circuit and a touch screen, a protective cover movably arranged on the casing for selectively covering and uncovering at least the touch screen, and a stylus for operating said touch screen, wherein the protective cover includes a compartment which substantially corresponds to the shape of at least part of the stylus and in which the stylus is removably stored.

2. A computer device according to claim 1, wherein said compartment is provided in an inner side of the protective cover.

3. A computer device according to claim 2, wherein the inner side of said protective cover is concave so that the inner side of said protective cover constitutes a concavity in which said compartment is arranged.

4. A computer device according to claim 1, wherein said compartment is integrally formed with said protective cover.

5. A computer device according to claim 2, wherein said protective cover comprises an inlay mounted on the inner side of said protective cover.

6. A computer device according to claim 5, wherein said compartment has a boundary wall reinforced by a plurality of supporting ribs on a back side of said inlay.

7. A computer device according to claim 5, wherein said inlay is made of a plastic material, and the protective cover is made of aluminium.

8. A computer device according to claim 5, wherein said compartment comprises a retention sheath for receiving part of said stylus.

9. A computer device according to claim 8, wherein said retention sheath has an inner side on which a locking projection is formed, and said stylus includes a locking recess for engaging the locking projection of the retention sheath.

10. A computer device according to claim 8, wherein said retention sheath comprises a swivel catch for tilting said stylus away from the protective cover.

11. A computer device according to claim 8, wherein said compartment comprises a longitudinal slot having opposite longitudinal sides and opposite longitudinal ends and being surrounded by a boundary wall.

12. A computer device according to claim 11, wherein said slot has a central portion including a reduced width, and said stylus has a narrowed portion which corresponds to the width of said central portion of the slot.

13. A computer device according to claim 11, wherein said boundary wall of the slot and said stylus have a flat shape.

14. A computer device according to claim 11, wherein the retention sheath is formed on one of said longitudinal ends of said slot and has an opened portion directed toward another of said longitudinal ends of said slot.

15. A computer device according to claim 14, wherein the retention sheath has a curved cut-out which extends on one of said longitudinal sides of said slot toward the other of said longitudinal ends of said slot.

16. A computer device according to claim 15, wherein the other of said longitudinal sides of said slot includes an indentation for facilitating engagement of said stylus to pivotally retrieve the same out of said slot.

17. A computer device according to claim 15, wherein the boundary wall of said slot at the one of said longitudinal sides of said slot is lower than that of the other of said longitudinal sides of said slot.

* * * * *